(12) United States Patent
Kim

(10) Patent No.: US 11,568,206 B2
(45) Date of Patent: Jan. 31, 2023

(54) SYSTEM, METHOD AND APPARATUS FOR MACHINE LEARNING

(71) Applicant: LG ELECTRONICS INC., Seoul (KR)

(72) Inventor: Nam Joon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 678 days.

(21) Appl. No.: 16/579,295

(22) Filed: Sep. 23, 2019

(65) Prior Publication Data
US 2020/0019842 A1 Jan. 16, 2020

(30) Foreign Application Priority Data
Jul. 5, 2019 (KR) .................. 10-2019-0081266

(51) Int. Cl.
*G06N 3/04* (2006.01)
*G06K 9/62* (2022.01)
*G06N 3/08* (2006.01)

(52) U.S. Cl.
CPC ......... *G06N 3/0454* (2013.01); *G06K 9/6218* (2013.01); *G06N 3/0481* (2013.01); *G06N 3/088* (2013.01)

(58) Field of Classification Search
CPC .......... G06N 3/08; G06N 3/084; G06N 20/00; G06N 3/0481; G06N 3/088; G06K 9/6218
USPC ............................... 706/15; 375/219, 240.02
See application file for complete search history.

(56) References Cited

U.S. PATENT DOCUMENTS

| | | | | |
|---|---|---|---|---|
| 10,504,027 B1* | 12/2019 | Kim | ................... | G06V 10/10 |
| 10,885,620 B2* | 1/2021 | Hwang | ................ | G06T 7/0004 |
| 11,176,154 B1* | 11/2021 | Dasgupta | ............ | G06K 9/6253 |
| 2017/0300776 A1* | 10/2017 | Yamamoto | ............ | G06V 10/42 |
| 2019/0043185 A1* | 2/2019 | Hwang | ................ | G06N 3/0472 |
| 2019/0205765 A1* | 7/2019 | Mondello | ............ | G06N 3/0454 |
| 2020/0302234 A1* | 9/2020 | Walters | ................ | G06K 9/6276 |
| 2020/0402221 A1* | 12/2020 | Ijiri | ..................... | G06K 9/6274 |

FOREIGN PATENT DOCUMENTS

KR 1020180025093 3/2018

* cited by examiner

*Primary Examiner* — Emmanuel Bayard
(74) *Attorney, Agent, or Firm* — Fish & Richardson P.C.

(57) ABSTRACT

Disclosed is an artificial intelligence or machine learning algorithm that may be applied to a plurality of machine learning devices in a 5G environment connected to perform the Internet of things. A machine learning method by a first learning machine according to one embodiment of the present disclosure may include obtaining input data; determining, from among a plurality of clusters, a cluster to which the input data belongs, by using a first artificial neural network; transmitting a plurality of sample features associated with the determined cluster to a second learning device using a second artificial neural network; receiving a label for the plurality of sample features from the second learning device, in response to the transmission; and associating the received label with the determined cluster.

20 Claims, 10 Drawing Sheets

SYSTEM, METHOD AND APPARATUS FOR MACHINE LEARNING

CROSS-REFERENCE TO RELATED APPLICATION

Pursuant to 35 U.S.C. § 119(a), this application claims the benefit of an earlier filing date of and the right of priority to Korean Application No. 10-2019-0081266, filed on Jul. 5, 2019, the contents of which are incorporated by reference herein in their entirety.

BACKGROUND

1. Technical Field

The present disclosure relates to machine learning, and more particularly, to performing joint machine learning through cooperation between a plurality of devices.

2. Description of Related Art

Artificial intelligence (AI) is an area of computer engineering science and information technology that studies methods to make computers mimic intelligent human behaviors such as reasoning, learning, self-improving, and the like. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance based on experiential data. Machine learning algorithms, rather than only executing rigidly set static program commands, may be used to take an approach that builds models for deriving predictions and decisions from inputted data.

With the proliferation of the Internet of things (IoT), home appliances such as televisions, washing machines, refrigerators, vacuum cleaners, and air conditioners; personal terminals such as smartphones, wearable devices, and tablets; and various sensors are interconnected in various ways to provide new services. Each individual device is also equipped with a processor capable of machine learning.

Real-world input data to be subjected to machine learning is becoming more diverse in, for example, type and form. However, there is a limitation in that an individual device having low processing performance performs machine learning on its own to build a trained model. In addition, since the trained model built into the device is unable to process as much data as a trained model built into, for example, a server, a label coverage area therefore may also be very limited. For example, while the types or forms of articles that may be stored in a refrigerator are very diverse, the range of articles that may be covered by the refrigerator performing machine learning on its own is greatly limited.

Korean Patent Application Publication No. 10-2018-0025093, entitled "A METHOD AND APPARATUS FOR MACHINE LEARNING BASED ON WEAKLY SUPERVISED LEARNING" (hereinafter referred to as "Related Art 1"), discloses a method capable of training a convolutional network on its own by only utilizing a small dataset in an environment in which a large dataset cannot be secured. However, it is difficult to apply the method disclosed in Related Art 1 to an individual device having low processing performance.

SUMMARY OF THE INVENTION

One embodiment of the present disclosure is directed to addressing the shortcomings of making it difficult to build a trained model capable of covering various input data in an individual device with low processing performance in the related art.

One embodiment of the present disclosure is further directed to providing a machine learning system, method, and apparatus that allows a plurality of devices capable of performing machine learning to cooperate with each other to extend a coverage area of a trained model.

One embodiment of the present disclosure is still further directed to providing a machine learning system, method, and apparatus that allow the individual device to cooperate with another device to perform machine learning with little overhead and without the burden of exposing personal information.

Embodiments of the present disclosure are not limited to what has been disclosed hereinabove. Other objectives and features of the present disclosure which are not mentioned can be understood from the following description and will be more clearly understood by the embodiments of the present disclosure. In addition, it is to be understood that the objectives and features of the present disclosure may be realized by various means as pointed out in the appended claims and combination thereof.

A machine learning system, method, and apparatus according to one embodiment of the present disclosure is configured such that a first learning device and a second learning device may cooperate with each other to perform joint machine learning. Specifically, the first learning device may be configured to determine, from among a plurality of clusters, a cluster to which input data belongs, by using a first artificial neural network, and the second learning device may be configured to determine a label for the determined cluster by using a second artificial neural network.

A machine learning method according to one embodiment of the present disclosure may be performed by a first learning device, and may include obtaining input data; determining, from among a plurality of clusters, a cluster to which the input data belongs, by using a first artificial neural network; transmitting a plurality of sample features associated with the determined cluster to a second learning device using a second artificial neural network; and receiving a label for the plurality of sample features from the second learning device, in response to the transmission.

The machine learning method according to one embodiment of the present disclosure may further include associating the received label with the determined cluster.

The received label may be determined based on analyzing the plurality of sample features by using the second artificial neural network in the second learning device.

The machine learning method according to one embodiment of the present disclosure may further include extracting the plurality of sample features from a plurality of features classified into the cluster, wherein a variance value of the extracted sample features may exceed a predetermined threshold value.

The machine learning method according to one embodiment of the present disclosure may further include obtaining a second input data; receiving a label for the second input data; and transmitting at least one feature of the second input data and the label for the second input data to the second learning device, wherein the at least one feature of the second input data and the label for the second input data may be used as training data for training the second artificial neural network in the second learning device.

The first learning device may include a terminal, and the second learning device may include a server. In addition, the second artificial neural network may include more hidden layers than the first artificial neural network.

A first learning device using a first artificial neural network according to one embodiment of the present disclosure may include an input unit configured to obtain input data; a communication unit configured to communicate with a second learning device using a second artificial neural network; and at least one processor, wherein the at least one processor may be configured to determine, from among a plurality of clusters, a cluster to which the input data belongs, by using the first artificial neural network; transmit a plurality of sample features associated with the determined cluster to the second learning device via the communication unit; receive a label for the plurality of sample features via the communication unit from the second learning device, in response to the transmission; and associate the received label with the determined cluster.

The received label may be determined based on analyzing the plurality of sample features by using the second artificial neural network in the second learning device.

The at least one processor may be configured to extract the plurality of sample features from a plurality of features classified into the cluster, wherein a variance value of the extracted sample features may exceed a predetermined threshold value.

The input unit may be configured to obtain a second input data and a label for the second input data, the at least one processor may be configured to transmit at least one feature of the second input data and the label for the second input data to the second learning device, and the at least one feature of the second input data and the label for the second input data may be used as training data for training the second artificial neural network in the second learning device.

The first learning device may include a terminal, and the second learning device may include a server. In addition, the second artificial neural network may include more hidden layers than the first artificial neural network.

A machine learning system according to one embodiment of the present disclosure may include a first learning device configured to obtain input data; and a second learning device communicatively connected to the first learning device, wherein the first learning device may be configured to determine, from among a plurality of clusters, a cluster to which the input data belongs, by using a first artificial neural network, and wherein the second learning device may be configured to determine a label for the determined cluster by using a second artificial neural network.

The first learning device may be configured to transmit a plurality of sample features associated with the determined cluster to the second learning device, the second learning device may be configured to determine a label for the plurality of sample features by using the second artificial neural network and transmit the determined label to the first learning device, and the label for the plurality of sample features may be associated with the determined cluster.

The first learning device may be configured to obtain a second input data and a label for the second input data, and transmit at least one feature of the second input data and the label for the second input data to the second learning device, and the second learning device may be configured to train the second artificial neural network by using the at least one feature of the second input data and the label for the second input data as training data.

The first learning device may include a terminal, and the second learning device may include a server. In addition, the second artificial neural network may include more hidden layers than the first artificial neural network.

The first learning device and the second learning device may be communicatively connected to each other over a 5G communication network.

A machine learning method according to another embodiment of the present disclosure may be performed by a second learning device, and may include receiving a plurality of sample features associated with a cluster to which input data belongs, from a first learning device using a first artificial neural network; determining a label for the plurality of sample features by a second artificial neural network; and transmitting the determined label to the first learning device, wherein the transmitted label may be associated with the cluster by the first learning device.

The machine learning method according to another embodiment of the present disclosure may further include receiving at least one feature of a second input data and a label for the second input data from the first learning device; and training the second artificial neural network by using the at least one feature of the second input data and the label for the second input data as training data.

A refrigerator according to one embodiment of the present disclosure may perform machine learning by using a first artificial neural network, and may include a storage chamber having a plurality of storage spaces; an input unit configured to obtain input data relating to an article to be stored in the storage chamber; a communication unit configured to communicate with a server using a second artificial neural network; and at least one processor, wherein the at least one processor may be configured to determine, from among a plurality of clusters, a cluster to which the article belongs, based on analyzing at least one feature of the input data by using the first artificial neural network; transmit a plurality of sample features associated with the determined cluster to the server via the communication unit; receive a label for the plurality of sample features via the communication unit from the server, in response to the transmission; and determine, from among the plurality of storage spaces, a recommended storage space for storing the article, based on the received label.

The received label may be determined based on analyzing the plurality of sample features by using the second artificial neural network in the server.

The refrigerator according to one embodiment of the present disclosure may further include a plurality of illumination devices for illuminating the plurality of storage spaces, and the at least one processor may be configured to turn on at least one illumination device corresponding to the recommended storage space among the plurality of illumination devices.

The input unit may be configured to obtain a second input data relating to a second article and a label for the second input data, the at least one processor may be configured to transmit at least one feature of the second input data and the label for the second input data to the server, and the at least one feature of the second input data and the label for the second input data may be used as training data for training the second artificial neural network in the server.

The communication unit and the server may be configured to communicate with each other over a 5G communication network.

A refrigerator control method according to one embodiment of the present disclosure may include obtaining input data relating to an article to be stored in a storage chamber having a plurality of storage spaces; determining, from among a plurality of clusters, a cluster to which the article belongs, based on analyzing at least one feature of the input data by using a first artificial neural network; transmitting a plurality of sample features associated with the determined cluster to a server using a second artificial neural network; receiving a label for the plurality of sample features from the server, in response to the transmission; and determining, from among the plurality of storage spaces, a recommended storage space for storing the article, based on the received label.

The received label may be determined based on analyzing the plurality of sample features by using the second artificial neural network in the server.

The refrigerator control method according to one embodiment of the present disclosure may further include turning on at least one illumination device corresponding to the recommended storage space among the plurality of illumination devices for illuminating the plurality of storage spaces.

The refrigerator control method according to one embodiment of the present disclosure may further include obtaining a second input data relating to a second article; receiving a label for the second article; and transmitting at least one feature of the second input data and the label for the second input data to the server, wherein the at least one feature of the second input data and the label for the second input data may be used as training data for training the second artificial neural network in the server.

A computer program according to one embodiment of the present disclosure may be stored in a computer-readable storage medium, and may include program code for causing a learning device to perform the machine learning method described above.

According to one embodiment of the present disclosure, two or more devices capable of performing machine learning may cooperate with each other to extend a coverage area of a trained model. Therefore, the artificial intelligence or machine learning performance of an individual device can be improved in the Internet of things environment implemented as a 5G communication network. For example, a refrigerator and a server, which are capable of performing machine learning, may cooperate with each other to extend the coverage area of the trained model.

According to one embodiment of the present disclosure, an artificial intelligence or machine learning performance of an individual device having low processing performance can be improved. For example, since a refrigerator may determine a label for a new article with the help of a server, the artificial intelligence or machine learning performance of the refrigerator can be improved.

According to one embodiment of the present disclosure, an individual device may cooperate with another device to perform machine learning with little overhead and without the burden of exposing personal information. For example, a refrigerator may cooperate with a server to perform machine learning with little overhead and without the burden of exposing personal information of a user using an article.

The effects of the present disclose are not limited to the above-mentioned effects, and other effects not mentioned may be clearly understood by those skilled in the art from the appended claims.

BRIEF DESCRIPTION OF THE DRAWINGS

The foregoing and other aspects and features of the disclosure, as well as the following detailed description of the embodiments, will be better understood when read in conjunction with the accompanying drawings. For the purpose of illustrating the present disclosure, there is shown in the drawings an exemplary embodiment. It is to be understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
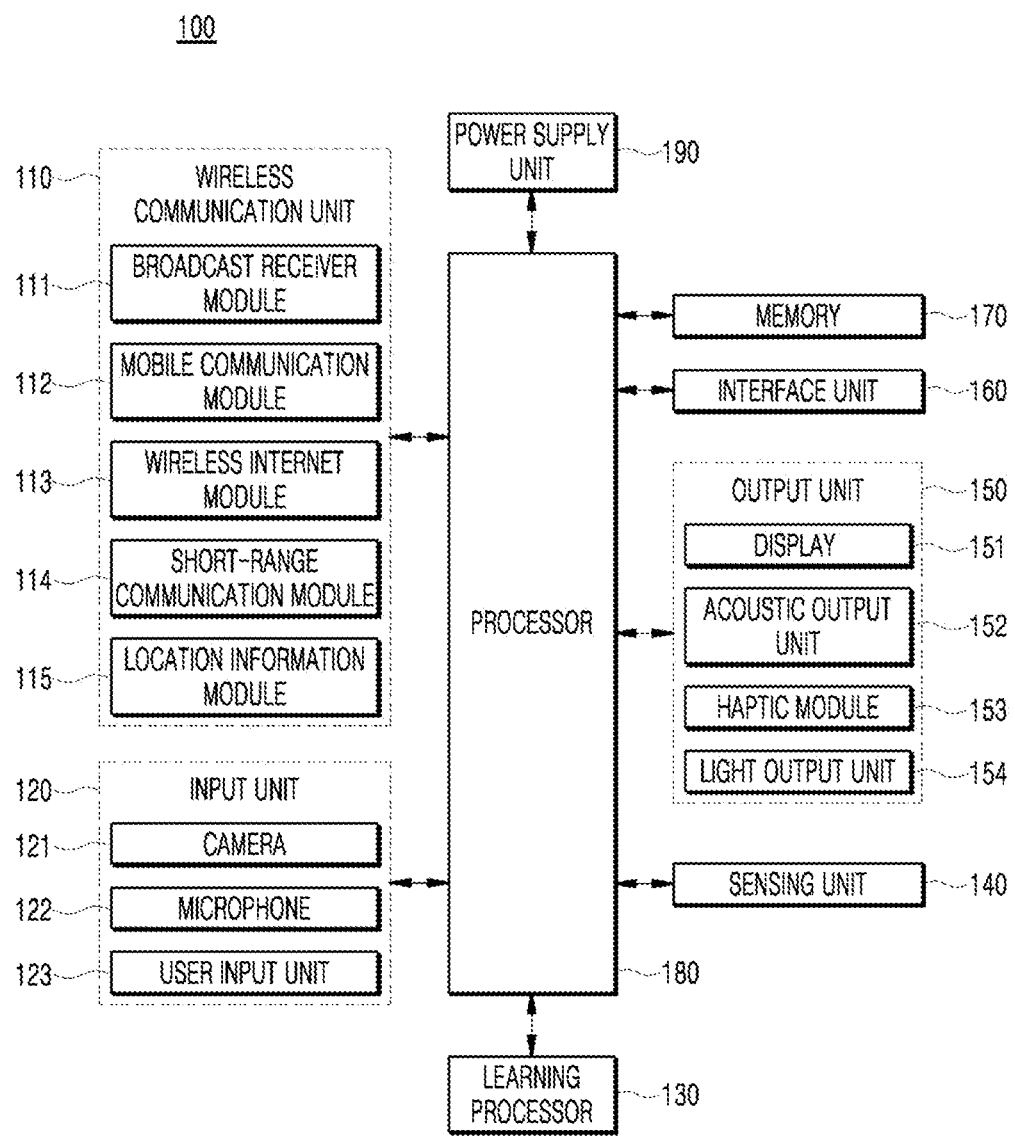
FIG. 1 is a block diagram illustrating a configuration of a machine learning device according to one embodiment of the present disclosure.

The embodiments disclosed in the present specification will be described in greater detail with reference to the accompanying drawings, and throughout the accompanying drawings, the same reference numerals are used to designate the same or similar components and redundant descriptions thereof are omitted. In the following description, the suffixes "module" and "unit" that are mentioned with respect to the elements used in the present description are merely used individually or in combination for the purpose of simplifying the description of the present invention, and therefore, the suffix itself will not be used to differentiate the significance or function or the corresponding term. Further, in the description of the embodiments of the present disclosure, when it is determined that the detailed description of the related art would obscure the gist of the present disclosure, the description thereof will be omitted. Also, the accompanying drawings are provided only to facilitate understanding of the embodiments disclosed in the present disclosure and therefore should not be construed as being limiting in any way. It should be understood that all modifications, equivalents, and replacements which are not exemplified herein but are still within the spirit and scope of the present disclosure are to be construed as being included in the present disclosure.

The terms such as "first," "second," and other numerical terms may be used herein only to describe various elements and only to distinguish one element from another element, and as such, these elements should not be limited by these terms.

Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Artificial intelligence (AI) is an area of computer engineering science and information technology that studies methods to make computers mimic intelligent human behaviors such as reasoning, learning, self-improving, and the like.

In addition, AI does not exist on its own, but is rather directly or indirectly related to a number of other fields in computer science. Particularly in recent years, there have been numerous attempts to introduce an element of AI into various fields of information technology to address problems of the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance based on experiential data. Machine learning algorithms, rather than only executing rigidly set static program commands, may be used to take an approach that builds models for deriving predictions and decisions from input data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

The decision tree refers to an analysis method that uses a tree-like graph or model of decision rules to perform classification and prediction.

The Bayesian network may include a model that represents the probabilistic relationship (conditional independence) among a set of variables. Bayesian network may be appropriate for data mining via unsupervised learning.

SVM may include a supervised learning model for pattern detection and data analysis, heavily in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science. ANNs may refer generally to models that has artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

ANN may include a number of layers, each including a number of neurons. Furthermore, ANN may include synapses that connect the neurons to one another.

ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

ANN may be classified as a single-layer neural network or a multi-layer neural network, based on the number of layers therein.

In general, the single-layer neural network may include an input layer and an output layer.

In general, the multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

ANN can be trained by using training data. The training may refer to the process of determining parameters of the artificial neural network by using the training data, to perform tasks such as classification, regression analysis, and clustering of inputted data. Such parameters of the artificial neural network may include synaptic weights and biases applied to neurons.

The artificial neural network trained by using training data can classify or cluster inputted data according to a pattern within the inputted data.

Throughout the present disclosure, the artificial neural network trained by using training data may be referred to as a trained model.

Hereinbelow, learning paradigms of the artificial neural network will be described in detail.

Learning paradigms, in which the artificial neural network operates, may be classified into supervised learning, unsupervised learning, semi-supervised learning, and reinforcement learning.

Supervised learning is a machine learning method that derives a single function from the training data. Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label. Here, the label may refer to a target answer (or a result value) to be guessed by the artificial neural network when the training data is inputted to the artificial neural network. Throughout the present disclosure, the target answer (or a result value) to be guessed by the artificial neural network when the training data is inputted may be referred to as a label or labeling data. Throughout the present disclosure, assigning one or more labels to the training data in order to train the artificial neural network may be referred to as labeling the training data with labeling data.

Training data and label corresponding to the training data together may form a single training set, and as such, they may be inputted to the artificial neural network as a training set.

The training data may represent a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label. More specifically, unsupervised learning may be a training scheme that trains the artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other. The generator may be a model generating new data that generates new data based on true data. The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

AE is a neural network which aims to reconstruct its input as output. More specifically, AE may include an input layer, at least one hidden layer, and an output layer.

Since the number of nodes in the hidden layer is smaller than the number of nodes in the input layer, the dimensionality of data is reduced, thus leading to data compression or encoding. Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data. One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process. Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of the artificial neural network may be determined by a number of factors, including the number of hidden layers, the number of hidden nodes included in each hidden layer, input feature vectors, target feature vectors, and so forth.

The hyperparameters may include various parameters which need to be initially set for learning, much like the initial values of the model parameters. Also, the model parameters may include various parameters sought to be determined through learning. For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting the model parameters so as to reduce the loss function, and the purpose of learning may be to determine the model parameters that minimize the loss function. Loss functions typically use means squared error (MSE) or cross entropy error (CEE), but the present disclosure is not limited thereto.

The cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size. Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of the artificial neural network rely not only on the structure and learning optimization algorithms of the artificial neural network but also on the hyperparameters thereof. Therefore, in order to obtain a good trained model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

FIG. 1 is a block diagram illustrating a configuration of a machine learning device according to one embodiment of the present disclosure. Referring to FIG. 1, a terminal 100 may be configured as the machine learning device. The terminal 100 may include a wireless communication unit 110, an input unit 120, a learning processor 130, a sensing unit 140, an output unit 150, an interface unit 160, a memory 170, a processor 180, and a power supply unit 190.

The terminal 100 may include various electronic devices capable of performing machine learning. For example, the terminal 100 may be implemented as a stationary terminal and a mobile terminal, such as a mobile phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a vacuum cleaner, an air conditioner, a desktop computer, a projector, and a digital signage. The terminal 100 may be implemented as various forms of home appliances for household use, and may be also implemented as a stationary or mobile robot.

The terminal 100 may perform a function of an audio agent. The audio agent may be a program, which recognizes user's speech and outputs an audio response appropriate to the recognized user's speech.

A trained model may be provided to the terminal 100. The trained model may be implemented as hardware, software, or a combination of hardware and software, and in cases where the trained model is partially or entirely implemented as software, at least one command constituting the trained model may be stored in the memory 170.

The wireless communication unit 110 may include at least one of a broadcast receiver module 111, a mobile communication module 112, a wireless internet module 113, a short-range communication module 114, or a location information module 115.

The broadcast receiver module 111 receives broadcast signals or broadcast-related information through a broadcast channel from an external broadcast management server.

The mobile communication module 112 may transmit/receive a wireless signal to/from at least one of a base station, an external terminal, or a server over a mobile communication network established according to the technical standards or communication methods for mobile communication (for example, Global System for Mobile communication (GSM), Code Division Multiple Access (CDMA), Frequency Division Multiple Access (FDMA), Code Division Multiple Access 2000 (CDMA2000), Time Division Multiple Access (TDMA), Orthogonal Frequency Division Multiple Access (OFDMA), Single Carrier Frequency Division Multiple Access (SC-FDMA), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and 5G).

The wireless internet module 113 is a module for wireless internet access, and may be built in or external to the terminal 100. The wireless internet module 113 may be configured to transmit/receive a wireless signal over a communication network according to wireless internet technologies. The wireless internet technologies may include, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and 5G.

The short-range communication module 114 is a module for supporting short-range communication. The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining a location of the terminal 100, and its representative example includes a Global Positioning System (GPS) module or a Wireless-Fidelity (Wi-Fi) module. When configured as the GPS module, the location information module 115 may obtain the location of the terminal 100 by using a signal transmitted from a GPS satellite.

The input unit 120 may include at least one camera 121 for obtaining an image signal, a microphone 122 for obtaining an audio signal, and a user input unit 123 for receiving information inputted from a user. Speech data or image data collected by the input unit 120 may be analyzed and processed as a user's control command.

The input unit 120 may obtain training data for model training, and input data to be used to obtain output by using a trained model. The input unit 120 may obtain unprocessed input data and in this case, the processor 180 or the learning processor 130 may preprocess the obtained data, and generate training data or preprocessed input data which may be inputted for model training. The preprocessing of input data may include extracting an input feature from the input data.

The camera 121 processes video frames, such as still images and moving images, which are obtained by an image sensor in a video communication mode or a photographing mode. The processed video frames may be displayed on a display 151 or stored in the memory 170.

The microphone 122 converts an external acoustic signal into electrical speech data. The converted speech data may be utilized in various manners according to a function (or an application program being executed) being performed in the terminal 100. Meanwhile, the microphone 122 may implement various noise removal algorithms for removing noise generated in the process of receiving the external acoustic signal.

The user input unit 123 is for receiving information inputted from a user. When the information is inputted via the user input unit 123, the processor 180 may control the terminal 100 such that the operation of the terminal 100 corresponds to the inputted information.

The user input unit 123 may include a mechanical input means (for example, a button, a dome switch, a jog wheel, and a jog switch which are located at the front/rear or side of the terminal 100) and a touch-type input means. For example, the touch-type input means may be configured as a virtual key, a soft key, or a visual key which are displayed on a touch screen via software processing, or may be configured as a touch key disposed on a portion other than the touch screen.

The learning processor 130 trains a model consisting of an artificial neural network by using training data. More specifically, the learning processor 130 may repeatedly train the artificial neural network by using various training schemes described above to determine optimized model parameters of the artificial neural network.

Throughout the present disclosure, the artificial neural network of which parameters are determined by being trained using training data, may be referred to as a trained model. The trained model may be used to infer a result value with respect to new input data rather than training data.

The learning processor 130 may be configured to receive, classify, store, and output information to be used for data mining, data analysis, intelligent decision making, and machine learning algorithms and technologies.

The learning processor 130 may include one or more memory units configured to store data received, detected, sensed, generated, predefined, or outputted by other component, device, terminal, or apparatus in communication with the terminal.

The learning processor 130 may include a memory integrated or implemented in the terminal 100. In some embodiments, the learning processor 130 may be implemented by using the memory 170.

Alternatively or additionally, the learning processor 130 may be implemented by using a memory related to the terminal, such as an external memory directly coupled to the terminal 100 or a memory maintained in a server in communication with the terminal 100.

In another embodiment, the learning processor 130 may be implemented by using a memory maintained in a cloud computing environment, or another remote memory location accessible by the terminal 100 via a communications method such as a network.

The learning processor 130 may generally be configured to store data in one or more databases in order to identify, index, categorize, manipulate, store, retrieve, and output data for supervised or unsupervised learning, data mining, predictive analysis, or use in another machine. In such a case, the database may be implemented by using the memory 170, a memory maintained in a cloud computing environment, or another remote memory location accessible by the terminal 100 via the communications method such as the network.

Information stored in the learning processor 130 may be used by one or more other controllers of the terminal 100 or the processor 180 by using one of various different types of data analysis algorithms and machine learning algorithms.

As an example of such an algorithm, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, a Petri Nets (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, automated planning, and the like, may be provided.

The processor 180 may determine or predict at least one executable operation of the terminal 100 based on information generated or determined by using data analysis and machine learning algorithms. To this end, the processor 180 may request, retrieve, receive, or utilize the data from the learning processor 130, and may control the terminal 100 such that the terminal 100 performs a predicted operation or desirable operation of the at least one executable operation.

The processor 180 may perform various functions to implement intelligent emulation (that is, a knowledge based system, an inference system, and a knowledge acquisition system). This may be applied to various types of systems (for example, fuzzy logic systems), including, for example, adaptive systems, machine learning systems, and artificial neural networks.

The processor 180 may also include submodules that enable operations involving speech and natural language speech processing, such as an I/O processing module, an environment condition module, a Speech to Text (STT) processing module, a natural language processing module, a workflow processing module, and a service processing module.

Each of these submodules may have access to one or more systems or data and models at the terminal, or a subset or superset thereof. In addition, each of these submodules may provide various functions, including a vocabulary index, user data, a workflow model, a service model, and an automatic speech recognition (ASR) system.

In another embodiment, other aspect of the processor 180 or the terminal may be implemented with the submodule, system, or data and model.

In some examples, based on data from the learning processor 130, the processor 180 may be configured to identify and detect a requirement, based on contextual condition or user's intent represented by a user input or a natural language input.

The processor 180 may actively derive and obtain information to be used to fully determine the requirement based on the contextual condition or the user's intent. For example, the processor 180 may actively derive information to be used to determine the requirement by analyzing historical data including, for example, historical inputs and outputs, pattern matching, unambiguous words, and input intent.

The processor 180 may determine a task flow for executing a function responding to the requirement based on the contextual condition or the user's intent.

The processor 180 may be configured to collect, sense, extract, detect or receive, by one or more sensing components of the terminal, signal or data to be used in data analysis and machine learning operation, in order to collect information for processing and storing in the learning processor 130.

Collecting information may include detecting information via a sensor, extracting information stored in the memory 170, or receiving information from another terminal, entity, or external storage device via communication means.

The processor 180 may collect usage history information in the terminal, and store it in the memory 170. The processor 180 may use the stored usage history information and prediction modeling to determine the best match for executing a specific function.

The processor 180 may receive or detect the environment information or other information via a sensing unit 140.

The processor 180 may receive a broadcast signal or broadcast-related information, a wireless signal, or wireless data via the wireless communication unit 110.

The processor 180 may receive image information (or a corresponding signal), audio information (or a corresponding signal), data, or user input information from the input unit 120.

The processor 180 may collect information in real time, process or classify the information (for example, knowledge graph, command policy, personalization database, and dialog engine), and store the processed information in the memory 170 or the learning processor 130.

When the operation of the terminal 100 is determined based on a data analysis and a machine learning algorithm and technique, the processor 180 may control components of the terminal 100 such that the components of the terminal 100 perform the determined operation. Subsequently, the processor 180 may execute the determined operation by controlling the terminal 100 according to the control command.

When a specific operation is performed, the processor 180 may analyze history information indicating the execution of the specific operation via the data analysis and the machine learning algorithm and technique, and perform an update of previously trained information based on the analyzed information.

Therefore, the processor 180, along with the learning processor 130, may improve the accuracy of the future performance of the data analysis and the machine learning algorithm and technique based on the updated information.

The sensing unit 140 may include one or more sensors for sensing at least one of information related to the terminal 100 itself, information on an environment surrounding the terminal 100, or user information. For example, the sensing unit 140 may include at least one of a proximity sensor, an illumination sensor, a touch sensor, an acceleration sensor, a magnetic sensor, a gravitational sensor (G-sensor), a gyroscope sensor, a motion sensor, an RGB sensor, an infrared sensor (IR sensor), a finger scan sensor, an ultrasonic sensor, an optical sensor (see, for example, camera 121), a microphone (see microphone 122), a battery gauge, an environment sensor (for example, a barometer, a hygrometer, a thermometer, a radiation detection sensor, a heat detection sensor, and a gas sensing sensor), or a chemical sensor (for example, an electronic nose, a healthcare sensor, and a biometric sensor). Meanwhile, the terminal 100 disclosed herein may combine and utilize information sensed by at least two sensors among these sensors.

The output unit 150 is for generating an output such as a visual output, an audible output, or a haptic output, and may include at least one of a display 151, an acoustic output unit 152, a haptic module 153, or a light output unit 154.

The display 151 is configured to display (output) information processed in the terminal 100. For example, the display 151 may display execution screen information on the application program executed in the terminal 100, or a user interface (UI) and graphic user interface (GUI) information according to the execution screen information.

Since the display 151 may form a mutually layered structure with the touch sensor or may be formed integrally with the touch sensor, the display 141 may implement a touch screen. This touch screen may function as the user input unit 123 to provide an input interface between the terminal 100 and the user, and at the same time may provide an output interface between the terminal 100 and the user.

The acoustic output unit 152 may be configured to output speech data received from the wireless communication unit 110 or stored in the memory 170, for example, in a call signal reception mode, a call mode, a record mode, a speech recognition mode, and a broadcast reception mode. The acoustic output unit 152 may include at least one of a receiver, a speaker, or a buzzer.

The haptic module 153 is configured to generate various haptic effects that the user can feel. A representative example of the haptic effects generated by the haptic module 153 may include vibration.

The light output unit 154 is configured to output a signal for notifying an event occurrence by using light from a light source of the terminal 100. Examples of the event capable of occurring in the terminal 100 may include, for example, message reception, call signal reception, missed call, alarm, schedule notification, email reception, and reception of information via an application.

The interface unit 160 is configured to serve as a path for connection between the terminal 100 and various types of external devices. This interface unit 160 may include at least one of a wired/wireless headset port, an external charger port, a wired/wireless data port, a memory card port, a port for connecting a device having an identification module, an audio input/output (I/O) port, a video input/output (I/O) port, or an earphone port. In response to an external device being connected to the interface unit 160, the terminal 100 may control the connected external device.

Meanwhile, the identification module is a chip for storing various types of information for authenticating the usage right of the terminal 100, and may include, for example, a user identify module (UIM), a subscriber identity module (SIM), and a universal subscriber identity module (USIM). The device having the identification module (hereinafter referred to as 'identification device') may be manufactured in the form of a smart card. Accordingly, the identification device may be connected to the terminal 100 through the interface unit 160.

The memory 170 stores data for supporting various functions of the terminal 100. The memory 170 may store a plurality of application programs (or applications) executed in the terminal 100, data for operating the terminal 100, commands, and data for operating the learning processor 130 (for example, at least one algorithm information for machine learning).

The memory 170 may store a model trained by the learning processor 130. The memory 170 may classify the trained model into a plurality of versions depending on, for example, a training time or a training progress, where necessary, and may store the classified trained model.

The memory 170 may store, for example, input data obtained by the input unit 120, learning data (or training data) used for model training, and training history of a model. The input data stored in the memory 170 may be data suitably processed for model training, as well as unprocessed input data itself.

The processor 180 typically controls the overall operation of the terminal 100, in addition to the operations associated with the application program. The processor 180 may provide the user with appropriate information or functionality or may process it, by processing, for example, signals, data, and information inputted or outputted via the above-mentioned components or by executing the application program stored in the memory 170.

The processor 180 may control at least some of the components shown in FIG. 1 such that the application program stored in the memory 170 is executed. In addition, the processor 180 may operate at least two of the components included in the terminal 100 in combination to execute the application program.

Meanwhile, as described above, the processor 180 typically controls the overall operation of the terminal 100, in addition to the operations associated with the application program. For example, when the state of the terminal 100 satisfies a predetermined condition, the processor 180 may execute a lock state to prevent the user from inputting a control command for the applications, or may release the lock state.

Under the control of the processor 180, the power supply unit 190 is supplied with external power or internal power, and supplies power to each component included in the terminal 100. This power supply unit 190 may include a battery, which may be an internal battery or a replaceable battery.

Figure 2:
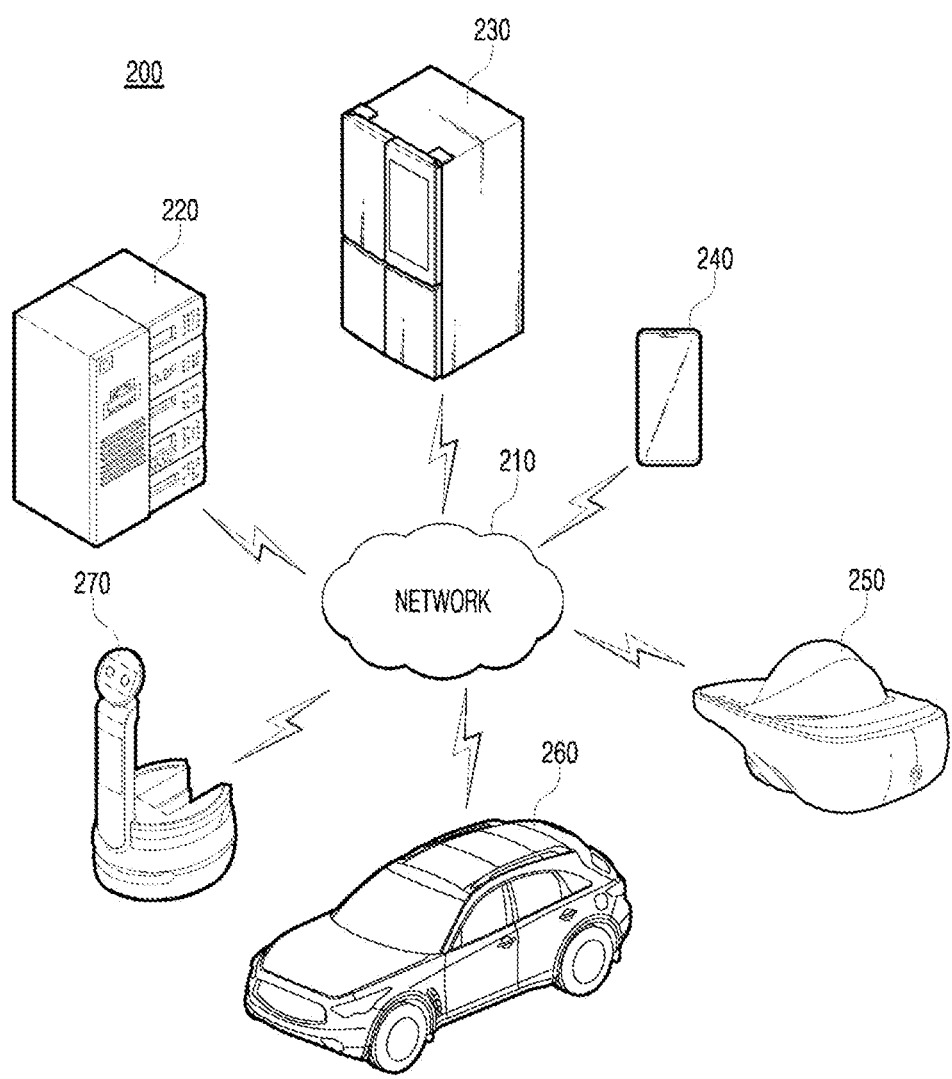
FIG. 2 is a view illustrating an operating environment of a machine learning system according to one embodiment of the present disclosure.

FIG. 2 is a block diagram illustrating an environment of a machine learning system according to one embodiment of the present disclosure. Referring to FIG. 2, a machine learning system 200 according to one embodiment of the present disclosure may include a cloud network 210, a server 220, a home appliance 230, a smartphone 240, an XR device 250, an autonomous vehicle 260, and a robot 270.

The cloud network 210 may refer to a network that forms part of a cloud computing infrastructure or exists in a cloud computing infrastructure. This cloud network 210 may include, but is not limited to, wired networks such as local area networks (LANs), wide area networks (WANs), metropolitan area networks (MANs), and integrated service digital networks (ISDNs); or wireless networks such as wireless LANs, CDMA, WCDMA, LTE, LTE-A, 5G, Bluetooth™, and satellite communications.

The cloud network 210 may include connections of network elements, such as hubs, bridges, routers, switches, and gateways. The cloud network 210 may include one or more connected networks such as a multi-network environment, including a public network such as the Internet and a private network such as a secure enterprise private network. Access to the cloud network 210 may be provided over one or more wired or wireless access networks. In addition, the cloud network 210 may support various types of object intelligence communications, such as Internet of things (IoT), Internet of everything (IoE), and Internet of small things (IoST), or a 5G communication, to exchange and process information between distributed components such as objects.

The devices 220, 230, 240, 250, 260, 270 constituting the machine learning system 200 may be connected to each other over the cloud network 210. The devices 220, 230, 240, 250, 260, 270 may communicate with each other via a base station, but may also communicate with each other directly without the base station.

Each of the devices 220, 230, 240, 250, 260, 270 constituting the machine learning system 200 may be configured to include all or a part of the components of the terminal 100 shown in FIG. 1. In addition to the illustrated devices 220, 230, 240, 250, 260, 270, various electronic devices may be included in the machine learning system 200.

Figure 3:
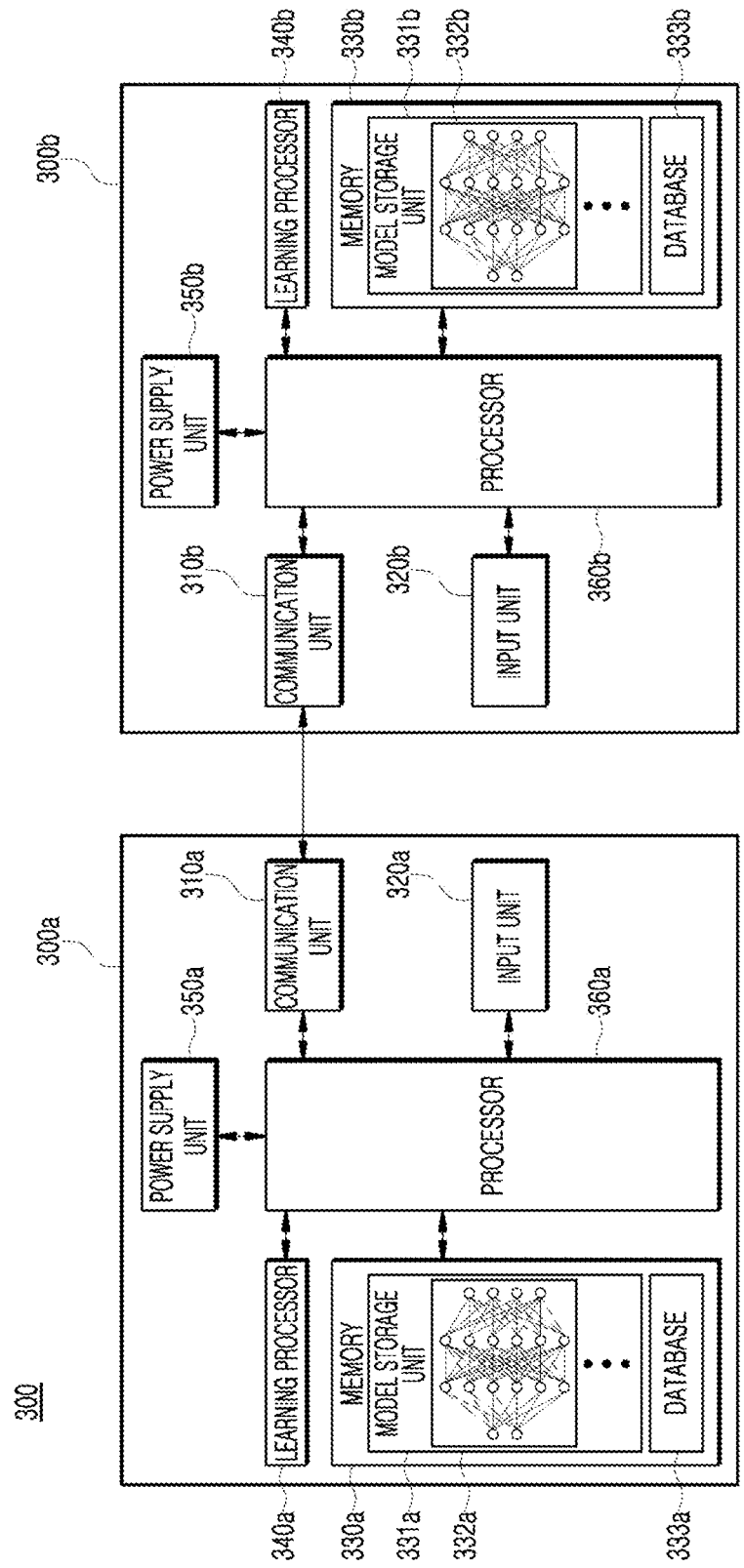
FIG. 3 is a block diagram illustrating a configuration of a machine learning system according to one embodiment of the present disclosure.
Figure 4:
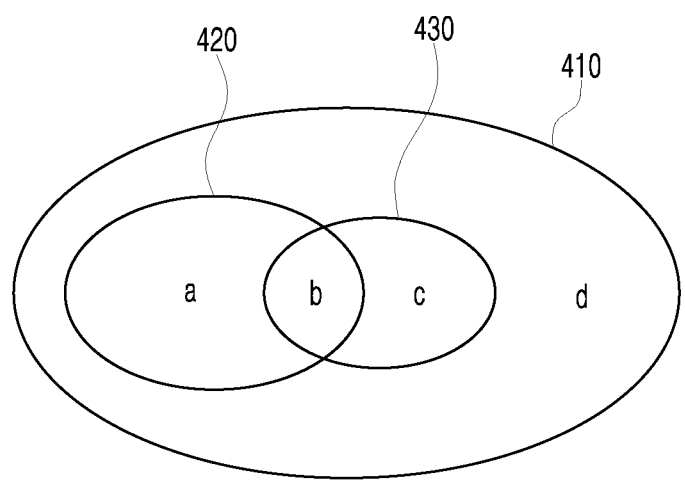
FIG. 4 is a view illustrating a coverage area of a trained model of each device of a machine learning system according to one embodiment of the present disclosure.

FIG. 3 is a block diagram illustrating a configuration of a machine learning system according to one embodiment of the present disclosure. FIG. 4 is a view illustrating a coverage area of a trained model of each learning device of a machine learning system according to one embodiment of the present disclosure.

Referring to FIG. 3, the machine learning system 300 according to one embodiment of the present disclosure may include a first learning device 300a and a second learning device 300b.

The first learning device 300a and the second learning device 300b may be any one of the terminal 100 shown in FIG. 1 or the devices 220, 230, 240, 250, 260, 270 shown in FIG. 2. For example, the first learning device 300a and the second learning device 300b may be implemented as the same or different types of terminals 100, and at least one of the first learning device 300a or the second learning device 300b may be implemented as the server 220.

The first learning device 300a may include a communication unit 310a, an input unit 320a, a memory 330a, a learning processor 340a, a power supply unit 350a, and a processor 360a. The second learning device 300b may include a communication unit 310b, an input unit 320b, a memory 330b, a learning processor 340b, a power supply unit 350b, and a processor 360b.

The communication units 310a, 310b may correspond to the configuration including the wireless communication unit 110 and the interface unit 160 shown in FIG. 1. The input units 320a, 320b, the learning processors 340a, 340b, the power supply units 350a, 350b, and the processors 360a, 360b may correspond to the input unit 120, the learning processor 130, the power supply unit 190, and processor 180 shown in FIG. 1, respectively.

The memories 330a, 330b may correspond to the memory 170 shown FIG. 1. The memories 330a, 330b may include model storage units 331a, 331b and databases 333a, 333b, respectively.

The model storage units 331a, 331b store a model (or artificial neural networks 332a, 332b) trained or being trained via learning processors 340a, 340b, and when the model is updated through training, store the updated model. The model storage units 331a, 331b may classify the trained model into a plurality of versions depending on, for example, a training time or a training progress, where necessary, and may store the classified trained model.

The databases 333a, 333b store, for example, input data obtained by the input units 320a, 320b, learning data (or training data) used for model training, and training history of a model. The input data stored in the databases 333a, 333b may be data suitably processed for model training, as well as unprocessed input data itself.

The first learning device 300a may perform machine learning by using the first artificial neural network 332a. The second learning device 300b may perform machine learning by using the second artificial neural network 332b. The first and second artificial neural networks 332a, 332b may be implemented as hardware, software, or a combination of hardware and software. When the first and second artificial neural networks 332a, 332b are partially or completely implemented as software, one or more commands constituting the first and second artificial neural networks 332a, 332b may be stored in the memories 330a, 330b. The first and second artificial neural networks 332a, 332b illustrated in FIG. 3, are provided as one example of an artificial neural network including a plurality of hidden layers. Accordingly, the artificial neural network according to one embodiment of the present disclosure is not limited thereto.

The first learning device 300a and the second learning device 300b according to one embodiment of the present disclosure may cooperate with each other to perform joint machine learning. For convenience of explanation, joint machine learning between two learning devices is described, but the same or similar may be applied to three or more learning devices.

The term "joint machine learning" used herein means that a plurality of learning devices capable of machine learning on their own perform machine learning in a shared manner, and is distinguished from the fact that one device performs machine learning entirely on behalf of another device.

Due to, for example, a difference in processing performance or a difference in battery performance between the first learning device 300a and the second learning device 300b, the coverage area of the first trained model based on the first artificial neural network 332a and the coverage area of the second trained model based on the second artificial neural network 332b may not match. The coverage area of the trained model may represent a range of input data that may be labeled by the trained model.

FIG. 4 illustrates an overall coverage area 410 of a label for various input data existing in the real world, a second coverage area 420 of the second trained model of the second learning device 300b, and a first coverage area 430 of the first trained model of the first learning device 300a. In one embodiment, the first coverage area 430 and the second coverage area 420, which belong to the overall coverage area 410, may have an overlapping area b in common, and may have non-overlapping areas a, c, respectively.

One embodiment of the present disclosure allows the first learning device 300a and the second learning device 300b to cover, by joint machine learning, labels that are unable to be covered by their trained models. In one embodiment, the first learning device 300a may cover the input data having a label of area a by joint machine learning with the second learning device 300b, and the second learning device 300b may cover the input data having a label of area c by joint machine learning with the first learning device 300a. Therefore, the label coverage area of each learning device may be expanded. Each learning device may also gradually cover the input data having a label of area d by additional joint machine learning with other learning device.

In some embodiments, the processing performance of the second learning device 300b may be better than the processing performance of the first learning device 300a. For example, the first learning device 300a may be configured as a terminal having a relatively low processing performance, and the second learning device 300b may be configured as a server having a relatively high processing performance. In such a case, the second learning device 300b may be implemented, for example, as a plurality of server sets, a cloud server, or a combination thereof.

In one embodiment, the coverage area of the second trained model based on the second artificial neural network 332b may be wider than the coverage area of the first trained model based on the first artificial neural network 332a. The coverage area of the second trained model may or may not fully include the coverage area of the first trained model.

In another embodiment, the second artificial neural network 332b may include more hidden layers than the first artificial neural network 332a. For example, the first artificial neural network 332a may be shallower than the second artificial neural network 332b.

In yet another embodiment, the first artificial neural network 332a and the second artificial neural network 332b may use different learning methods. For example, the first artificial neural network 332a may perform unsupervised learning for input data or training data that has not been given a label, while the second artificial neural network 332b may perform supervised learning for input data or training data that has been given a label.

The input unit 320a of the first learning device 300a obtains the input data, and provides the processor 360a with the obtained input data. The processor 360a or the learning processor 340a of the first learning device 300a analyzes the at least one feature of the input data by using the first artificial neural network 332a. When a label for the input data is determined by the first artificial neural network 332a, the processor 360a of the first learning device 300a may control the operation of the first learning device 300a based on the determined label.

However, the label for the input data may not be determined by the first artificial neural network 332a. In other words, a first trained model based on the first neural network 332a may not have the label for input data. In such a case, the processor 360a or the learning processor 340a of the first learning device 300a may cluster the input data by performing the unsupervised learning by using the first neural network 332a. As a result of the clustering, the input data may be classified into any one of a plurality of clusters (or classes).

In one embodiment, the first neural network 332a may perform class-wise adaptation learning to cluster the input data. Other various algorithms capable of clustering the input data may be applied to the first neural network 332a.

The processor 360a or the learning processor 340a of the first learning device 300a may extract a plurality of sample features from a plurality of features associated with the determined cluster, and transmit the extracted sample features to the second learning device 300b via the communication unit 310a. In other words, the first learning device 300a may cluster the input data having the unidentified label into a specific cluster, and then extract, from among the features of the input data and the features previously classified as the specific cluster, some sample features. Extracting and transmitting the sample features representative of the cluster may reduce overhead compared to transmitting the input data as is or transmitting all the features associated with the cluster or class. In addition, since only the features are transmitted, no personal information of the user of the first learning device 300a is provided to the second learning device 300b.

The sample features may be extracted in a variety of ways from the plurality of features associated with the cluster. In one embodiment, the sample features may be extracted to include features located at the center of the cluster. These sample features may represent the most basic features of the cluster. In another embodiment, the sample features may be extracted such that a variance value of the extracted sample features exceeds a predetermined threshold value. That is, the sample features may be extracted to include not only features located at the center of the cluster, but also features located further outside of the cluster. Because these sample features may represent features of the entire cluster, a label determined based on the sample features may be associated with features of the entire cluster. In such a case, the threshold value may be selected as various values depending on, for example, the number of features associated with the cluster, the number of sample features to be extracted, and the design intent. In yet another embodiment, the sample features may be extracted at random, or be extracted to form a predetermined distribution.

The communication unit 310b of the second learning device 300b provides the processor 360b with a plurality of sample features received from the first learning device 300a. The processor 360b or the learning processor 340b of the second learning device 300b determine the label for the plurality of sample features by analyzing the plurality of sample features by using the second neural network 332b. The label for the plurality of sample features may be determined based on an output value from the second artificial neural network 332b that has received the plurality of sample features. The processor 360b of the second learning device 300b transmits the determined label to the first learning device 300a via the communication unit 310b.

The communication unit 310a of the first learning device 300a provides the processor 360a with the label received from the second learning device 300b. The processor 360a or the learning processor 340a of the first learning device 300a may associate the received label with a previously determined cluster. The processor 360a of the first learning device 300a may control the operation of the first learning device 300a based on the label associated with the cluster.

In one embodiment, the label received from the second learning device 300b may be used to train the first artificial neural network 332a in the first learning device 300a. For example, at least one feature of the input data, features associated with the cluster, and the received label may be used as training data for training the first neural network 332a.

In another embodiment, the label received from the second learning device 300b may be used only to control the operation of the first learning device 300a, and may be not used to train the first neural network 332a. This selection may be preferred when the processing performance of the first learning device 300a is low or the storage space thereof is not sufficient. In addition, since the communication between the first learning device 300a and the second learning device 300b in the 5G communication environment may take place in real time with little latency, it may be preferred that the first learning device 300a receives a label from the second learning device 300b when needed.

Meanwhile, not only the input data but also the label for the input data may be obtained via the input unit 320a of the first learning device 300a. In one embodiment, when the label for the input data is not determined by the first artificial neural network 332a, the first learning device 300a may obtain the label for the input data by inducing the user to input the label for the input data. In such a case, the processor 360a of the first learning device 300a may control the operation of the first learning device 300a based on the inputted label.

The label for the input data provided by the user may be a label that was not covered by both the first trained model of the first learning device 300a and the second trained model of the second learning device 300b before being provided by the user.

Accordingly, the first learning device 300a that has obtained the label for the input data may transmit at least one feature of the input data and the label for the input data to the second learning device 300b via the communication unit 310a.

The communication unit 310b of the second learning device 300b provides the processor 360b with at least one feature of the input data and the label for the input data, which are received from the first learning device 300a. The processor 360b or the learning processor 340b of the second learning device 300b may train the second artificial neural network 332b by using the at least one feature of the input data and the label of the input data as training data.

According to one embodiment of the present disclosure, the first learning device 300a and the second learning device 300b may cooperate with each other to extend the coverage area of the trained model. In particular, the artificial intelligence or machine learning performance of the first learning device 300a and the second learning device 300b can be improved in the Internet of things environment implemented as the 5G communication network.

Figure 5:
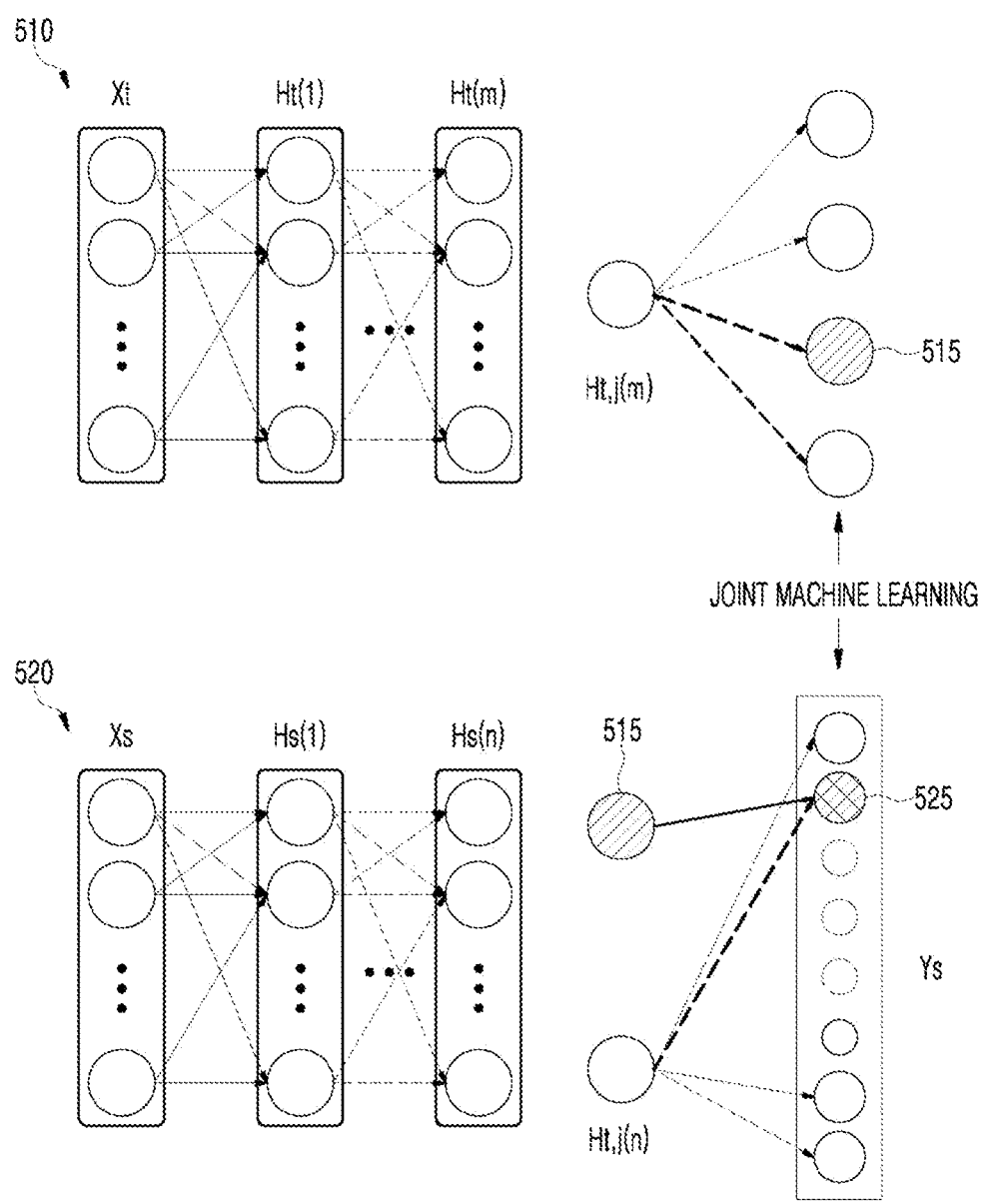
FIG. 5 is a view illustrating a joint machine learning operation of a machine learning system according to one embodiment of the present disclosure.

FIG. 5 is a view illustrating joint machine learning of a machine learning system according to one embodiment of the present disclosure. Referring to FIG. 5, the joint machine learning may be performed by using a first artificial neural network 510 and a second artificial neural network 520. In FIG. 5, Xt represents features of an input layer of the first artificial neural network 510, and Ht(k) represents features of the $k^{th}$ hidden layer of the first artificial neural network 510. Ht, j(k) represents features of the $k^{th}$ hidden layer for the $j^{th}$ sample. Xs represents features of an input layer of the second artificial neural network 520, Hs(k) represents features of the $k^{th}$ hidden layer of the second artificial neural network 520, and Ys represents a label of the second artificial neural network 520.

The first artificial neural network 510 may include m hidden layers, and the second artificial neural network 520 may include n hidden layers. When the first artificial neural network 510 is used by a learning device having a relatively low processing performance and the second artificial neural network 520 is used by a learning device having a relatively high processing performance, n may be greater than m. That is, the first artificial neural network 510 may be shallower than the second artificial neural network 520. However, due to other factors, the relationship between n and m may be determined regardless of the processing performance of the learning device.

The first artificial neural network 510 may perform unsupervised learning to determine, from among a plurality of clusters, a cluster (or class) 515 to which input data belongs. A plurality of sample features may be extracted from a plurality of features belonging to the determined cluster (or class) 515, and the extracted sample features may be inputted to the second artificial neural network 520. The second artificial neural network 520 may determine a label 525 for the sample features, and the label 525 for the sample features may be associated with a cluster or class 515 determined earlier by the first artificial neural network 510.

The first artificial neural network 510 and the second artificial neural network 520 may be provided to different learning devices, respectively. However, in some instances, the first artificial neural network 510 and the second artificial neural network 520 may be provided to different modules that perform different functions within the same device.

Figure 6:
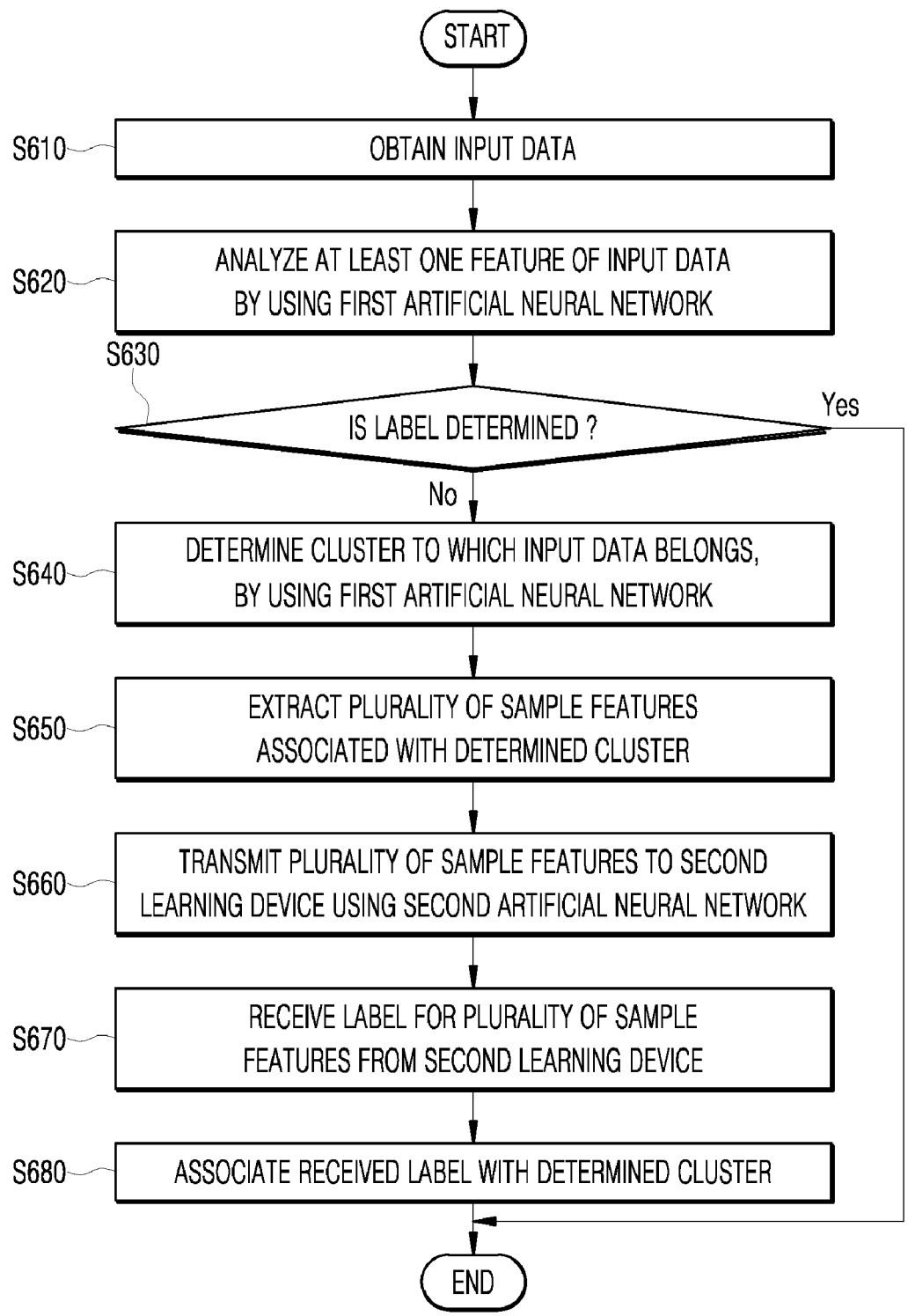
FIG. 6 is a flowchart illustrating a machine learning method according to one embodiment of the present disclosure.

FIG. 6 is a flowchart illustrating a machine learning method according to one embodiment of the present disclosure. The machine learning method shown in FIG. 6 may be performed by a first learning device using a first artificial neural network. In one embodiment, the first learning device may be a terminal, and a second learning device may be a server.

The first learning device obtains input data (S610). The first learning device analyzes at least one feature of the input data by using the first artificial neural network (S620). The first learning device determines whether a label for the input data is determined by the first artificial neural network (S630). When the label for the input data is determined by the first artificial neural network, the method according to one embodiment of the present disclosure ends. Subsequently, the first learning device may control the operation of the first learning device based on the determined label.

When the label for the input data is not determined by the first artificial neural network, the first learning device determines, from among a plurality of clusters, a cluster to which the input data belongs, by using the first artificial neural network (S640). The first learning device extracts a plurality of sample features from a plurality of features associated with the determined cluster (S650), and transmits the extracted sample features to the second learning device using a second artificial neural network (S660).

The first learning device receives the label for the plurality of sample features from the second learning device, in response to the transmission of the plurality of sample features (S670). The received label may be determined by analyzing the plurality of sample features by using the second artificial neural network in the second learning device. The first learning device associates the received label with the determined cluster (S680). Subsequently, the first learning device may control the operation of the first learning device based on the received label.

Figure 7:
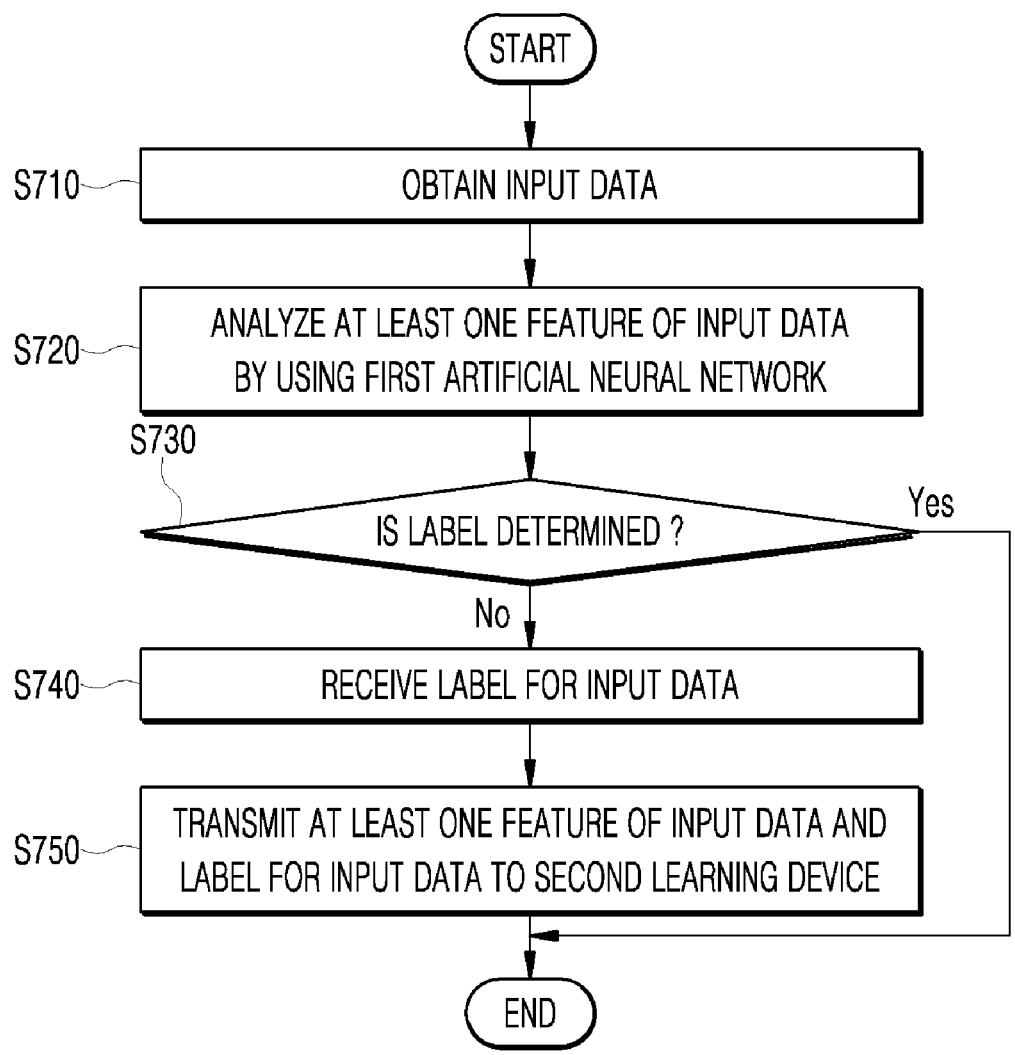
FIG. 7 is a flowchart illustrating a machine learning method according to one embodiment of the present disclosure.

FIG. 7 is a flowchart illustrating a machine learning method according to one embodiment of the present disclosure. The machine learning method shown in FIG. 7 may be performed by a first learning device using a first artificial neural network. In one embodiment, the first learning device may be a terminal, and a second learning device may be a server.

The first learning device obtains input data (S710). The first learning device analyzes the at least one feature of the input data by using the first artificial neural network (S720). The first learning device determines whether a label for the input data is determined by the first artificial neural network (S730). When the label for the input data is determined by the first artificial neural network, the method according to one embodiment of the present disclosure ends. The first learning device may control the operation of the first learning device based on the determined label.

When the label for the input data is not determined by the first artificial neural network, the first learning device receives the label for the input data (S740). In one embodiment, the first learning device may obtain the label for the input data by inducing the user to input the label for the input data.

The first learning device transmits at least one feature of the input data and the label for the input data to the second learning device using a second artificial neural network (S750). The at least one feature of the input data and the label for the input data, which are transmitted to the second learning device, may be used as training data for training the second artificial neural network in the second learning device.

Figure 8:
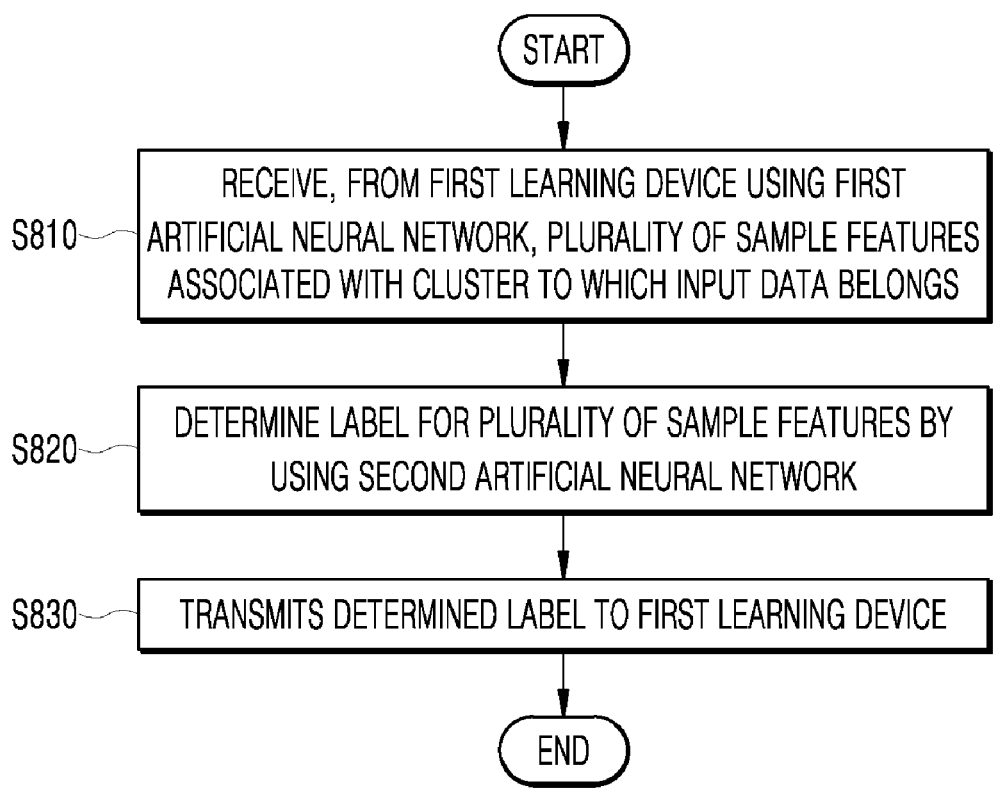
FIG. 8 is a flowchart illustrating a machine learning method according to one embodiment of the present disclosure.

FIG. 8 is a flowchart illustrating a machine learning method according to one embodiment of the present disclosure. The machine learning method shown in FIG. 8 may be performed by a second learning device using a second artificial neural network. In one embodiment, a first learning device may be a terminal, and the second learning device may be a server.

The second learning device receives, from the first learning device using a first artificial neural network, a plurality of sample features associated with a cluster to which input data belongs (S810). The second learning device determines a label for the plurality of sample features by using the second artificial neural network (S820), and transmits the determined label to the first learning device (S830). The transmitted label may be associated with the cluster by the first learning device.

Figure 9:
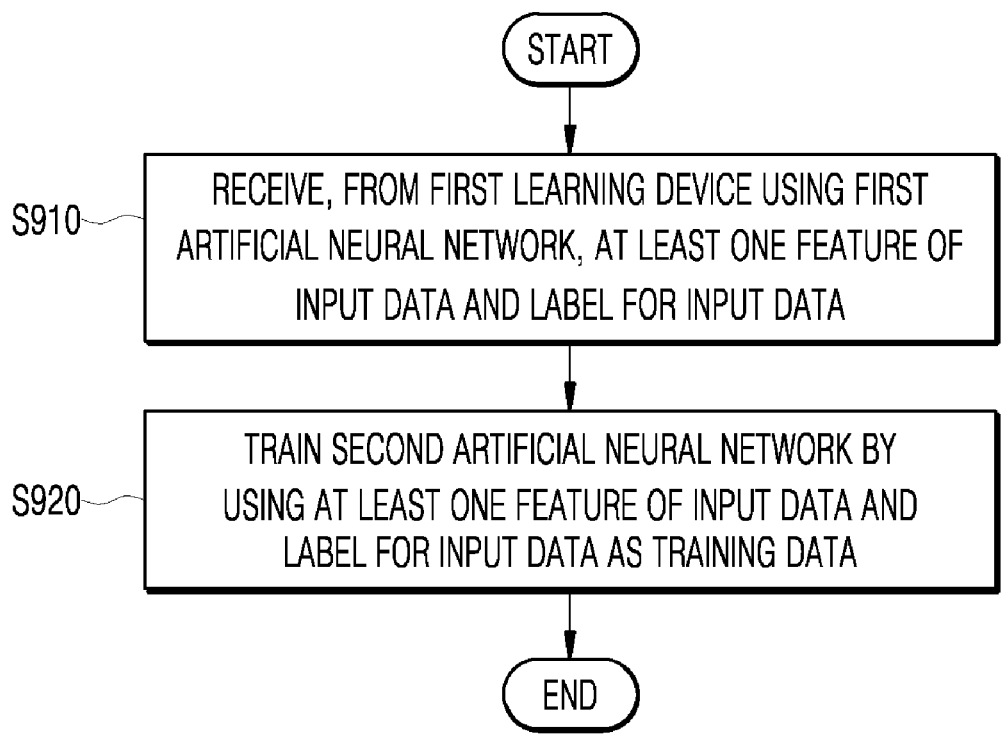
FIG. 9 is a flowchart illustrating a machine learning method according to one embodiment of the present disclosure.

FIG. 9 is a flowchart illustrating a machine learning method according to one embodiment of the present disclosure. The machine learning method shown in FIG. 9 may be performed by a second learning device using a second artificial neural network. In one embodiment, a first learning device may be a terminal, and the second learning device may be a server.

The second learning device receives, from the first learning device using a first artificial neural network, at least one feature of input data and a label for the input data (S910). The label for the input data may be obtained by the first learning device from a user. The second learning device trains the second artificial neural network by using the at least one feature of the input data and the label for the input data as training data (S920).

Meanwhile, the embodiments described above can be applied to joint machine learning between a refrigerator and a server, and thus be utilized to manage articles stored in the refrigerator.

The real-world articles that may be stored in the refrigerator are diverse, and even the same type of articles are diverse in form and condition (for example, milk, opened milk, an apple, a half-eaten apple, and a cut apple). Even if a processor capable of machine learning is provided to an individual refrigerator, the individual refrigerator has limitations in identifying the types and names of various articles.

According to one embodiment of the present disclosure, since the refrigerator may determine a label for a new article with the help of the server, an artificial intelligence or machine learning performance of the refrigerator may be improved. In addition, according to one embodiment of the present disclosure, the refrigerator may cooperate with the server to perform joint machine learning with little overhead and without the burden of exposing personal information of a user using the article.

The refrigerator is a home appliance capable of storing foodstuffs at low temperatures in a storage chamber that is shielded by a plurality of doors. The refrigerator may cool storage spaces by using cold air generated from heat exchange with a refrigerant circulating in a refrigeration cycle, thereby keeping the foodstuffs stored therein in a refrigerated or frozen state.

The refrigerator may be implemented to include some components of the terminal 100 shown in FIG. 1 or some components of the first learning device 300a shown in FIG. 3. The refrigerator 100 according to one embodiment of the present disclosure may include a wireless communication unit 110, an input unit 120, a learning processor 130, a sensing unit 140, an output unit 150, an interface unit 160, a memory 170, a processor 180, and a power supply unit 190. Explanations overlapping with FIGS. 1 and 3 will be omitted, and differences therebetween will be mainly described.

The refrigerator includes a storage chamber having a plurality of storage spaces, and the plurality of storage spaces may be variously classified depending on, for example, types, forms, and storage temperatures of the stored articles.

The input unit 120 may include a camera 121, a microphone 122, and a user input unit 123.

The camera 121 may be disposed at the front of the refrigerator to obtain image data of the user holding the article. In another embodiment, the camera 121 may be disposed at one side of a door to obtain image data of the user holding the article with the door being opened or image data of the article to be loaded into the storage chamber. In addition, the camera 121 may be disposed in each of the plurality of storage spaces to obtain image data of the articles stored in the each storage space and image data of an empty space in each storage space.

The microphone 122 may obtain a user's utterance speech (speech command). To more accurately obtain the user's utterance speech, a plurality of microphones 122 may be disposed. The plurality of microphones 122 may be disposed at different locations by being spaced apart from each other. In one embodiment, the microphone 122 may receive the user's utterance speech that notifies a label for the article to be stored in the refrigerator.

The user input unit 123 may receive information from the user. In one embodiment, the user input unit 123 may receive information that indicates the label for the article to be stored in the refrigerator.

The output unit 150 may include a display 151, an acoustic output unit 152, and a light output unit 154.

The display 151 may display, for example, information corresponding to the user's speech data (speech command), information on a processing result corresponding to the user's utterance speech, information on the storage state of the article in the refrigerator, and information on the recommended storage space for storing the article. The display 151 may be implemented as a touch screen to function as the user input unit 123 and to provide an output interface.

The acoustic output unit 152 may output by audio, for example, various notification messages, information corresponding to the user's utterance speech, and a processing result. In one embodiment, the acoustic output unit 152 may output utterance-inducing audio for inducing the user to input a label for the article to be stored in the refrigerator.

The light output unit 154 may include a plurality of illumination devices for illuminating the plurality of storage spaces in the storage chamber. At least one illumination device may be disposed in each storage space.

The processor 180 receives, from the input unit 120, input data relating to the article to be stored in the storage chamber. The processor 180 or the learning processor 130 analyzes the at least one feature of the input data by using the first artificial neural network.

When the label for the article is not determined by the first artificial neural network, the processor 180 may attempt to obtain the label for the article via the input unit 120 from the user. Nevertheless, when the label for the article is not inputted, the processor 180 or the learning processor 130 may cluster the input data by performing unsupervised learning by using the first artificial neural network. As a result of the clustering, the corresponding article may be classified into any one of a plurality of clusters (or classes).

The processor 180 or the learning processor 130 may extract a plurality of sample features from a plurality of features associated with the determined cluster, and transmit the extracted sample features to the server via the wireless communication unit 110. Extracting and transmitting the sample features may reduce overhead compared to transmitting the input data as is or transmitting all the features associated with the cluster. In addition, since only the features are transmitted, no personal information of the user of the refrigerator is provided to the server.

The processor 180 receives the label for the sample features from the server, in response to the transmission of the sample features. This label may be determined by analyzing the sample features by using the second artificial neural network in the server.

The processor 180 determines, from among the plurality of storage spaces, a recommended storage space for storing the corresponding article, based on the label determined by the first artificial neural network, the label inputted by the user, or the label received from the server. The processor 180 may determine the recommended storage space for storing the corresponding article based on, for example, the label of the corresponding article, the information on the empty space among the plurality of storage spaces, and the storage temperature of the corresponding article.

The processor 180 may inform the user of the determined recommended storage space via the output unit 150. The processor 180 may inform the user of the recommended storage space for storing the article, via at least one of the display 151 or the acoustic output unit 152. In another embodiment, the processor 180 may inform the user of the recommended storage space for storing the article, by turning on at least one illumination device corresponding to the recommended storage space among the plurality of illumination devices of the light output unit 154.

Figure 10:
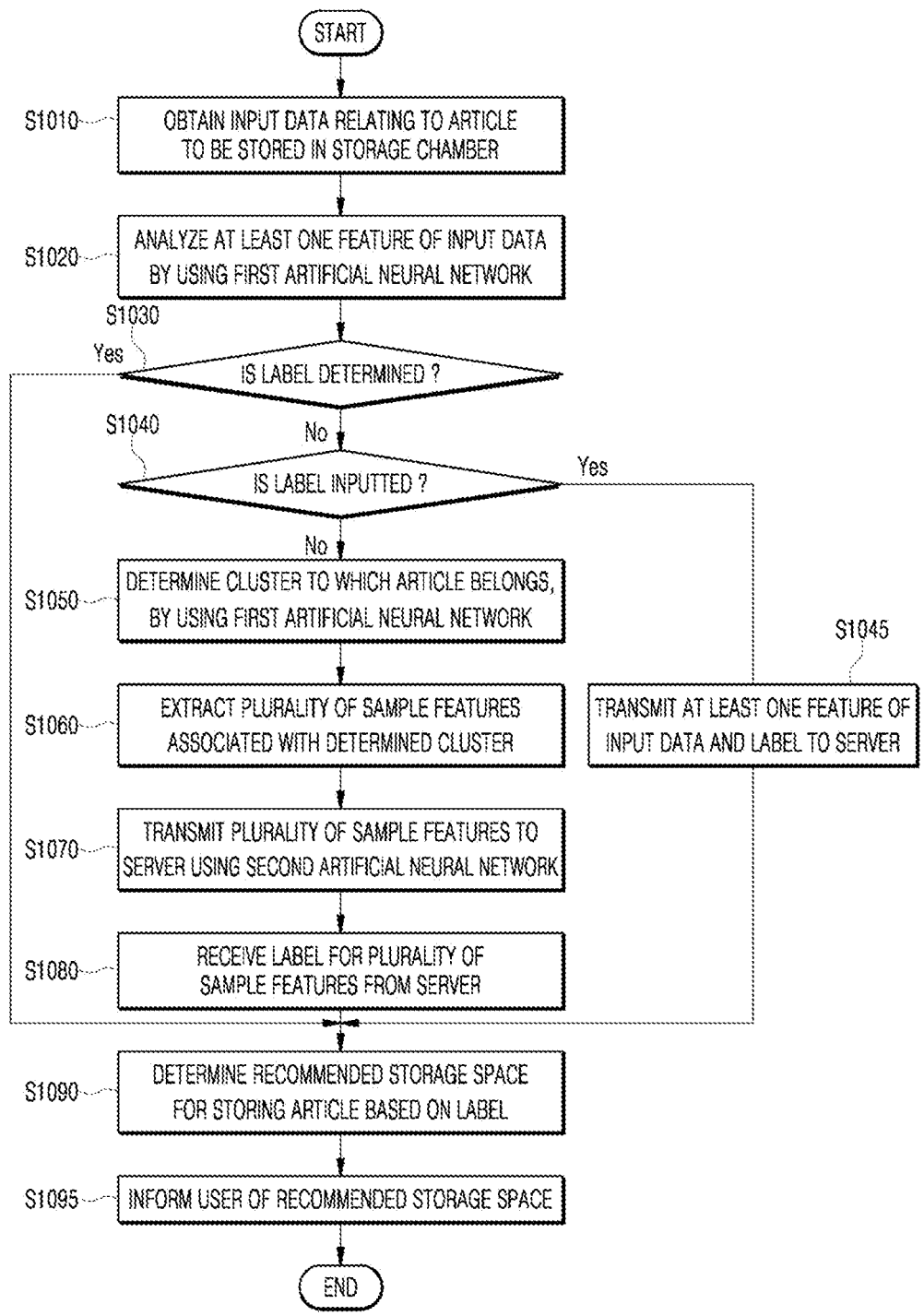
FIG. 10 is a flowchart illustrating a refrigerator control method according to one embodiment of the present disclosure.

FIG. 10 is a flowchart illustrating a refrigerator control method according to one embodiment of the present disclosure. The method shown in FIG. 10 may be performed by a refrigerator communicatively connected to a server.

The input unit 120 of the refrigerator obtains input data relating to an article to be stored in a storage chamber (S1010). The input data may include image data of the article.

The processor 180 or the learning processor 130 of the refrigerator analyzes at least one feature of the input data relating to the article by using a first artificial neural network (S1020). The processor 180 or the learning processor 130 determines whether a label for the article is determined (S1030). When the label for the article is determined by the first artificial neural network, the processor 180 may determine a recommended storage space for storing the article based on the determined label (S1090), and inform the user of the recommended storage space (S1095).

When the label for the article is not determined by the first artificial neural network, the processor 180 checks whether the label for the article is inputted via the input unit 120

(S1040). When the label for the article is inputted, the processor 180 transmits the at least one feature of the input data and the label for the article to the server using the second artificial neural network via the wireless communication unit 110 (S1045). The at least one feature of the input data and the label for the input data, which are transmitted to the server, may be used as training data for training a second artificial neural network in the server. Subsequently, the processor 180 may determine the recommended storage space for storing the article based on the inputted label (S1090), and inform the user of the recommended storage space (S1095).

When the label for the article is not inputted, the processor 180 or the learning processor 130 determines a cluster to which the article belongs, by analyzing the at least one feature of the input data by using the first artificial neural network (S1050). The processor 180 or the learning processor 130 extracts a plurality of sample features from a plurality of features associated with the determined cluster (S1060), and transmits the extracted sample features to the server using the second artificial neural network via the wireless communication unit 110 (S1070).

The processor 180 or the learning processor 130 receives the label for the plurality of sample features from the server, in response to the transmission of the plurality of sample features (S1080). The received label may be determined by analyzing the plurality of sample features by using the second artificial neural network in the server. The processor 180 or the learning processor 130 may determine the recommended storage space for storing the article based on the received label (S1090), and inform the user of the recommended storage space (S1095).

The example embodiments described above may be implemented through computer programs executable through various components on a computer, and such computer programs may be recorded on computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as code produced by a compiler, and higher level code that may be executed by the computer using an interpreter.

As used in the present disclosure (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A machine learning method, comprising:
   obtaining a first input data;
   determining, from a plurality of clusters, a cluster to which the first input data corresponds, the determination being made by processing the first input data in a first artificial neural network of a first device;
   extracting a plurality of sample features from a plurality of features representing at least an entirety of the cluster;
   transmitting the plurality of sample features associated with the determined cluster to a second artificial neural network of a second device;
   generating a first label corresponding to the transmitted plurality of sample features by analyzing the transmitted plurality of sample features in the second artificial neural network of the second device;
   transmitting the first label from the second device to the first device; and
   assigning the transmitted first label to the determined cluster by the first device.

2. The machine learning method of claim 1,
   wherein a variance value of the extracted plurality of sample features exceeds a predetermined threshold value.

3. The machine learning method of claim 1, further comprising:
   obtaining a second input data;
   receiving a second label corresponding to the second input data;
   transmitting at least one feature of the second input data and the second label from the first device to the second artificial neural network of the second device; and
   training the second artificial neural network of the second device by using at least one feature of the second input data and the second label as input and output of the second artificial neural network, respectively.

4. The machine learning method of claim 1, wherein the first device comprises a terminal, and the second device comprises a server.

5. A machine learning method, comprising:
   obtaining a first input data;
   determining, from a plurality of clusters, a cluster to which the first input data corresponds, the determination being made by processing the first input data in a first artificial neural network of a first device;
   extracting a plurality of sample features from a plurality of features representing at least an entirety of the cluster;
   transmitting the plurality of sample features associated with the determined cluster to a second artificial neural network of a second device;
   generating a first label corresponding to the transmitted plurality of sample features by analyzing the transmitted plurality of sample features in the second artificial neural network of the second device;

transmitting the first label from the second device to the first device; and assigning the transmitted first label to the determined cluster by the first device, wherein an amount of hidden layers of the second artificial neural network of the second device is greater than an amount of hidden layers of the first artificial neural network of the first device.

6. The machine learning method of claim 1, wherein the first artificial neural network of the first device performs unsupervised learning, and the second artificial neural network of the second device performs supervised learning.

7. A machine learning method, comprising:
obtaining a first input data;
determining, from a plurality of clusters, a cluster to which the first input data corresponds, the determination being made by processing the first input data in a first artificial neural network of a first device;
extracting a plurality of sample features from a plurality of features representing at least an entirety of the cluster;
transmitting the plurality of sample features associated with the determined cluster to a second artificial neural network of a second device;
generating a first label corresponding to the transmitted plurality of sample features by analyzing the transmitted plurality of sample features in the second artificial neural network of the second device;
transmitting the first label from the second device to the first device; and
assigning the transmitted first label to the determined cluster by the first device,
wherein the first device and the second device communicate with each other over a $5^{th}$ generation (5G) communication network.

8. A device configured to perform machine learning, comprising:
an input unit configured to obtain a first input data;
a communication unit configured to communicate with external devices; and
at least one processor configured to:
determine, from a plurality of clusters, a cluster to which the first input data corresponds, the determination being made by processing the first input data in an artificial neural network of the device;
extract a plurality of sample features from a plurality of features representing at least an entirety of the cluster;
transmit the plurality of sample features associated with the determined cluster to the external devices through the communication unit;
receive a first label for the plurality of sample features through the communication unit from the external devices, in response to the transmission; and
assign the received first label to the determined cluster by the device.

9. The device of claim 8, wherein the received first label is generated based on analyzing the plurality of sample features in at least one external device among the external devices.

10. The device of claim 8,
wherein a variance value of the extracted plurality of sample features exceeds a predetermined threshold value.

11. The device of claim 8, wherein the input unit is further configured to obtain a second input data and a second label corresponding to the second input data, and wherein the at least one processor is further configured to transmit at least one feature of the second input data and the second label to at least one external device among the external devices.

12. The device of claim 8, further comprising a terminal.

13. The device of claim 8, wherein an amount of hidden layers of an artificial neural network in at least one external device is greater than an amount of hidden layers of the artificial neural network of the device.

14. The device of claim 8, wherein the device is configured to communicate with the external devices over a $5^{th}$ generation (5G) communication network.

15. A machine learning system, comprising:
a first device configured to:
obtain a first input data;
determine, from a plurality of clusters, a cluster to which the first input data corresponds, the determination being made by processing the first input data in a first artificial neural network of a first device;
extract a plurality of sample features from a plurality of features representing at least an entirety of the cluster;
transmit the plurality of sample features associated with the determined cluster to a second artificial neural network of a second device; and
assign a first label to the determined cluster by the first device; and
the second device connected to the first device and configured to:
generate the first label corresponding to the transmitted plurality of sample features by analyzing the transmitted plurality of sample features in the second artificial neural network of the second device; and
transmit the first label from the second device to the first device.

16. The machine learning system of claim 15,
wherein the first device is further configured to obtain a second input data and a second label corresponding to the second input data, and transmit at least one feature of the second input data and the second label from the first device to the second artificial neural network of the second device, and
wherein the second device is further configured to train the second artificial neural network by using at least one feature of the second input data and the second label as input and output of the second artificial neural network respectively.

17. The machine learning system of claim 15, wherein the first device comprises a terminal, and the second device comprises a server.

18. The machine learning system of claim 15, wherein an amount of hidden layers of the second artificial neural network of the second device is greater than an amount of hidden layers of the first artificial neural network of the first device.

19. The machine learning system of claim 15, wherein the first device and the second device communicate with each other over a $5^{th}$ generation (5G) communication network.

20. The machine learning system of claim 15, wherein the first artificial neural network of the first device performs unsupervised learning, and the second artificial neural network of the second device performs supervised learning.

* * * * *